United States Patent [19]

Flechsig et al.

[11] Patent Number: 6,092,412

[45] Date of Patent: Jul. 25, 2000

[54] GLIDE HEIGHT TEST SIGNAL PROCESSOR AND METHOD USING INCREASED HIGH FREQUENCY COMPONENTS

[75] Inventors: Karl Arthur Flechsig, Los Gatos; Donald Edward Horne, San Jose; Sylvia Lui Lee, San Jose; Walter Gerald Woodworth, San Jose, all of Calif.

[73] Assignee: International Business Machines Corporation, Armonk, N.Y.

[21] Appl. No.: 09/072,946

[22] Filed: May 5, 1998

[51] Int. Cl.$^7$ .................................................. B23K 26/00
[52] U.S. Cl. ................................................................ 73/105
[58] Field of Search ................................ 73/105; 324/212

[56] References Cited

U.S. PATENT DOCUMENTS

| | | |
|---|---|---|
| 4,298,808 | 11/1981 | Hill . |
| 4,669,011 | 5/1987 | Lemke . |
| 4,777,544 | 10/1988 | Brown et al. . |
| 4,853,810 | 8/1989 | Pohl et al. . |
| 4,881,136 | 11/1989 | Shiraishi et al. . |
| 4,942,609 | 7/1990 | Meyer ........................................ 360/25 |
| 5,150,050 | 9/1992 | Genheimer et al. . |
| 5,168,413 | 12/1992 | Coker et al. . |
| 5,247,254 | 9/1993 | Huber et al. . |
| 5,256,965 | 10/1993 | Nomura .................................. 324/212 |
| 5,377,058 | 12/1994 | Good et al. . |
| 5,410,439 | 4/1995 | Egbert et al. ........................... 324/212 |
| 5,423,207 | 6/1995 | Flechsig et al. . |
| 5,528,922 | 6/1996 | Baumgart et al. ........................ 73/1.79 |
| 5,581,021 | 12/1996 | Flechsig et al. . |
| 5,637,999 | 6/1997 | Hennecken . |

OTHER PUBLICATIONS

"Detection of Magnetic Disk Asperities by Differential Pressure Sensing on a Slider Air–Bearing Surface," *Research Disclosure*, No. 305100, p. 696, Sep. 1989.

"Glide Test Technique," *IBM Technical Disclosure Bulletin*, vol. 32, No. 9A, pp. 280–283, Feb. 1990.

"Advanced Magnet Assembly for a Rotary VCM Actuator," *Research Disclosure*, No. 310100, p. 152, Feb. 1990.

"Advanced Piezoelectric Glide Channel," *IBM Technical Disclosure Bulletin*, vol. 38, No. 6, pp. 479–480, Jun. 1995.

*Primary Examiner*—Daniel S. Larkin
*Attorney, Agent, or Firm*—Altera Law Group, LLC

[57] ABSTRACT

A glide height test signal processor and method using increased high frequency components is disclosed. The processor is more sensitive to smaller asperities, maintains the positive characteristics of being monotonic and can be easily calibrated. The system includes a circuit for converting asperity contact to an electrical signal, a first bandpass circuit coupled to the first circuit, the first bandpass circuit having a first amplifier for amplifying the electrical signal by a first gain to generate a first amplified signal and a first filter for filtering the first amplified signal at a high frequency to generate a first filtered signal, wherein the first gain is selected for detection of asperities having a diameter of less than or equal to five microns and a processing circuit, coupled to the first bandpass circuit, for processing the first filtered signal to generate an indication of contact with an asperity having a diameter of less than or equal to five microns. A second bandpass circuit may be coupled to the first circuit, wherein the second bandpass circuit has a second amplifier for amplifying the electrical signal by a second gain to generate a second amplified signal and a second filter for filtering the second amplified signal at a low frequency to generate a second filtered signal, wherein the ratio of the first gain and the second gain is substantially at least thirty to one.

21 Claims, 4 Drawing Sheets

GLIDE HEIGHT TEST SIGNAL PROCESSOR AND METHOD USING INCREASED HIGH FREQUENCY COMPONENTS

BACKGROUND OF THE INVENTION

1. Field of the Invention

This invention relates in general to disk drives, and more particularly to a method and apparatus for performing surface analysis of a recording surface.

2. Description of Related Art

In a conventional magnetic storage drive, an air bearing slider supports a magnetic transducer in close proximity to a relatively moving recording surface. The recording surface typically comprises a rigid disk coated with a layer of magnetic material applied by a method such as spin-coating or sputtering. Coated disks must be substantially free of asperities to assure long-term reliability and data integrity at the head to disk interface, since asperities can lead to undesirable slider-disk contact or "head crash".

Glide height testing is one means for assuring an asperity-free disk. A slider is flown over the recording disk at a height equal to or below the desired data head fly height to analyze impacts between the slider and the disk surface. The slider includes one or more piezoelectric sensors bonded to an upper surface facing away from the recording surface. Piezoelectric materials are used because they generate an electric charge in response to internal stress. As the slider experiences rigid body displacement and flexural deformation as a result of contact with asperities, the adjacent sensor responds by generating a charge signal which may be monitored.

A dominant practice in the art has been to monitor the low frequency piezoelectric signals which corresponds to rigid body displacement resulting from the slider contacting large asperities on the disk surface. But as sliders decrease in size, magnetic transducers become vulnerable to relatively small asperities. For example, there is a class of asperities (e.g. disk delaminations) that are too small to cause head crashes, yet large enough to result in slider-disk contact adversely affecting device reliability. This class of asperities generates high frequency vibrations in the test slider which are difficult to detect.

The optimal sensitivity to small disk asperities is obtained by monitoring the high frequency vibrations of a test slider. Yet the high frequency components, or bending mode frequencies, of the response signal may vary greatly. Many modes display a non-monotonic response with increasing asperity interference height, i.e. the distance between the tip of an asperity and the minimum slider fly height. Non-monotonic modes indicate the occurrence of disk contact but provide no useful information about the size of the asperity causing contact.

The trend in recent years has been to produce storage systems having smaller sliders than the conventional slider which were approximately 4 mm long by 3.2 mm wide. Reductions in slider size necessitate a corresponding reduction in test slider dimensions. This reduction results in a weaker piezoelectric signal and poor signal-to-noise (S/N) ratio. Furthermore, the S/N ratio has also been shown to decrease with decreasing glide height. Thus, optimizing test slider sensitivity becomes increasingly important for smaller slider designs.

It is therefore desirable for a slider of predetermined size and fly height to identify one or more high frequency bending modes displaying monotonic behavior with increasing asperity interference. To that end, it becomes necessary to analyze the various bending mode frequencies individually. One method for isolating bending mode components is to electronically filter the high frequency signal generated by the piezoelectric sensor. But such filtering requires several filtering stages and becomes difficult with low S/N ratios.

An IBM Technical Disclosure Bulletin article entitled "Efficient Piezoelectric Glide Transducer for Magnetic Recording Disk Quality Assurance", Vol. 34, No. 4A, September 1992, describes a test slider comprising two piezoelectric transducers disposed on the upper surface of a slider about its longitudinal axis. Each half is oppositely poled with respect to the other. The arrangement increases the sensor's sensitivity to three low-frequency bending modes indicative of slider rigid body motion. However, detection of the high frequency bending modes is not discussed.

To realize the maximum advantage of advanced glide heads which are suitable for ultra-low flying and contact recording file products, advanced designs are needed. Another design is disclosed in IBM Technical Disclosure Bulletin article entitled "Advanced Piezoelectric Glide Channel", Vol. 38, No. 06, June 1995. To advance the current state-of-the-art in piezoelectric transducer (PZT) channels, this channel combines low noise amplification, high common-mode noise rejection, ground-noise isolation, and dual bandpass slider rigid and slider bending mode selection through filtering for use with slider-mounted PZT sensors.

The piezoelectric glide height sensor channel design/configuration provides for a monotonic sensor response with asperity interference height for signals derived from the slider rigid body modes, as well as selected slider bending modes. This combined channel is optimized for improved signal to noise and dynamic range for the detection of asperities on magnetic recording disks used in direct access storage devices. The low frequencies (slider air bearing modes) are required to detect large diameter (>15 microns) defects, and the high frequencies (slider bending modes) are required to detect small (<15 microns) defects. It is necessary to reject undesirable modes in between these two bands.

An example of the disclosed channels is one optimized for a small slider of 2.5 mm×1.6 mm×0.43 mm, where the desired modal response is the 5th and 7th modes between 1.0 and 1.4 MHz. The PZT crystal is configured such that the signal from these modes appears differentially between the front and back sections of the crystal. The channel consists of two main components, or physical sections. The first is a differential current (transconductance) amplifier (although a charge amplifier may also be used), and the second section contains the filters and buffers. The filters may include a low frequency filter, e.g., 25–200 kHz, and a high frequency filter, e.g., 1.0 to 1.4 MHz. A detector is then applied to the outputs of the filters to detect defects on the disk. One factor that makes this sensor productive is that the channel is monotonic with increasing defect size, and can be calibrated with laser melt bumps.

However, new files are being developed which have a nominal data head mechanical fly-height of $\leq 27$ nm. As a result small disk defects can escape the current glide test, and cause unacceptable hard errors in the file.

It can be seen that there is a need for an enhanced glide test that is more sensitive to smaller asperities.

It can also be seen that there is a need for an enhanced glide test that maintains the positive characteristics of being monotonic and which can be calibrated.

SUMMARY OF THE INVENTION

To overcome the limitations in the prior art described above, and to overcome other limitations that will become apparent upon reading and understanding the present specification, the present invention discloses a glide height test signal processor and method using increased high frequency components.

The present invention solves the above-described problems by providing an enhanced glide test that is more sensitive to smaller asperities, that maintains the positive characteristics of being monotonic and which can be calibrated.

A system in accordance with the principles of the present invention includes a first circuit for providing an electrical signal representing an asperity contact, a first bandpass circuit coupled to the first circuit, the first bandpass circuit having a first amplifier for amplifying the electrical signal by a first gain to generate a first amplified signal and a first filter for filtering the first amplified signal at a high frequency to generate a first filtered signal, wherein the first gain is selected for detection of asperities having a diameter of less than or equal to five microns and a processing circuit, coupled to the first bandpass circuit, for processing the first filtered signal to generate an indication of contact with an asperity having a diameter of less than or equal to five microns.

Other embodiments of a system in accordance with the principles of the invention may include alternative or optional additional aspects. One such aspect of the present invention is that the circuit for providing an electrical signal representing an asperity can further includes PZT slider heads coupled to a preamplifier.

Another aspect of the present invention is that the filter further includes a high pass filter, coupled to the first amplifier, the high pass filter selected to pass signals in a high band of frequencies.

Another aspect of the present invention is that a second bandpass circuit may be coupled to the first circuit, wherein the second bandpass circuit has a second amplifier for amplifying the electrical signal by a second gain to generate a second amplified signal and a second filter for filtering the second amplified signal at a low frequency to generate a second filtered signal, wherein the ratio of the first gain and the second gain is substantially at least thirty to one.

Another aspect of the present invention is that the second filter further includes a low pass filter, coupled to the second amplifier, the low pass filter selected to pass signals in a low band of frequencies.

Another aspect of the present invention is that the first bandpass circuit further includes a first full wave rectifier coupled to the first filter for generating a high frequency rectified signal representing the average for the filtered signals in the high band of frequencies and a first analog peak detector for detecting whether the high frequency rectified signal exceeds a high frequency threshold and generating a high frequency detection signal in response thereto and the second bandpass circuit further includes a second full wave rectifier coupled to the second filter for generating a low frequency rectified signal representing the average for the filtered signals in the low band of frequencies and a second analog peak detector for detecting whether the low frequency rectified signal exceeds a low frequency threshold and generating a low frequency detection signal in response thereto.

Another aspect of the present invention is that the processing circuit further includes an adder for adding the low and high frequency detection signals into a single output signal, and a peak detector for receiving the output signal and generating a peak detection signal for indicating contact with an asperity having a diameter of less than or equal to five microns.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a glide channel signal processor to enhance the sensitivity of existing piezoelectric transducers (PZT) glide height test channel for screening disks for mechanical defects. This signal processing technique allows screening out small disk defects, (e.g., ≦1–5 $\mu$m in diameter), that otherwise may result in disk delamination, thereby causing hard errors in disk storage files.

Figure 1:
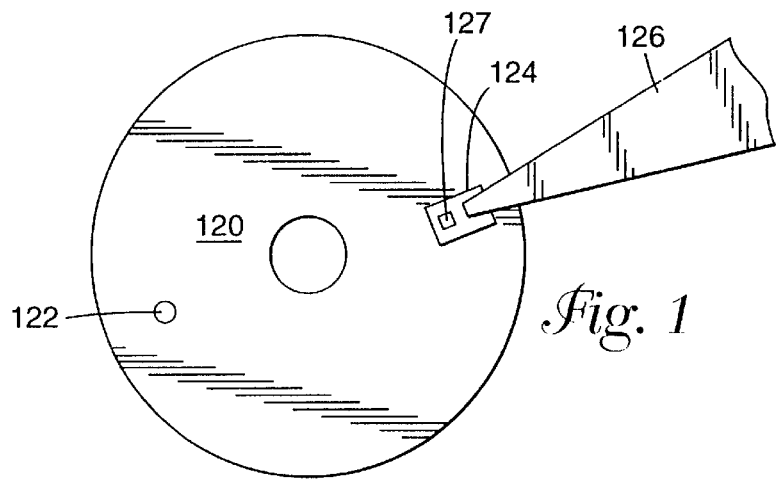
FIG. 1 illustrates a double-sided magnetic calibration disk which is being tested for asperities.

FIG. 1 illustrates a double-sided magnetic calibration disk 120 which is being tested for asperities, such as undesirable asperity 122, by a PZT slider 124 which is mounted on a suspension 126. As shown in FIG. 1, the PZT slider 124 carries a PZT transducer 127. It is important that the PZT slider be properly calibrated. If the PZT slider is not properly calibrated, the PZT slider may miss detecting undesirable asperities or it may detect asperities which are not undesirable. Accordingly, the PZT test slider 124 must be calibrated with bumps which emulate one or more undesirable asperities, such as asperity 122.

Figure 2:
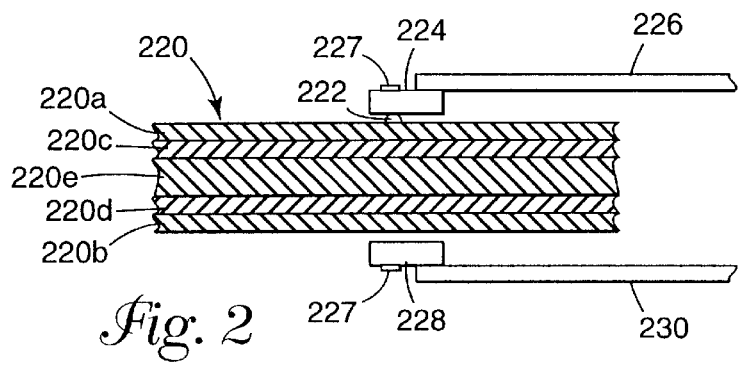
FIG. 2 illustrates top and bottom PZT sliders which are mounted on suspensions.

FIG. 2 illustrates top and bottom PZT sliders 224, 228 which are mounted on suspensions 226 and 230, respectively. The PZT slider 228 carries a PZT transducer 227 which is substantially identical to the PZT transducer 127 illustrated in FIG. 1. In FIG. 2, the top slider 224 is shown impacting the undesirable asperity 222. This asperity can be detected in a test stand as shown in FIG. 3.

Figure 3:
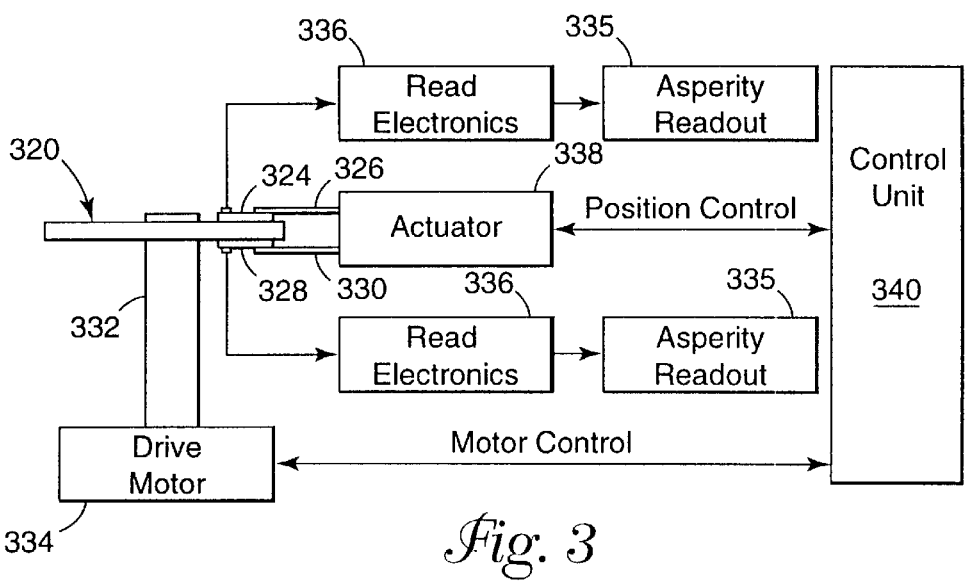
FIG. 3 illustrates a test system for detecting undesirable asperities.

FIG. 3 illustrates a test system 300 for detecting undesirable asperities. In FIG. 3, the top and bottom PZT sliders 324, 328 are suspended on opposite sides of the production run magnetic disk 320 by suspensions 326 and 330 respectively.

The disk 320 is mounted on a spindle 332 which is rotated by a drive motor 334. When the disk 320 is rapidly rotated both of the PZT sliders 324, 328 fly on an air bearing slightly off of the disk surface. The suspensions 326, 330 are moved substantially radially across the disk 320 by an actuator 338. Both the drive motor 334 and the actuator 338 are operatively connected to a control unit 340 so that linear movements of the suspensions 326, 330 and the rotation of the spindle 332 can be coordinated.

If an asperity is above this flying height of the PZT sliders 324, 328, the asperity is undesirable because it will impact one or both of the PZT sliders 324, 328. When this occurs, the slider portion of the PZT slider will flex causing the PZT transducer on the slider to flex and move producing an electrical output which is read by respective readouts 335 attached to the read electronics 336 of the piezoelectric glide channel. The asperity readouts 335 provide an indication of the detection of an asperity greater than the glide height of the PZT sliders 324, 328. Asperities that are below the glide height of the PZT sliders 324, 328 will be passed over, thereby indicating that the production run disk is satisfactory for its intended purpose.

Figure 4:
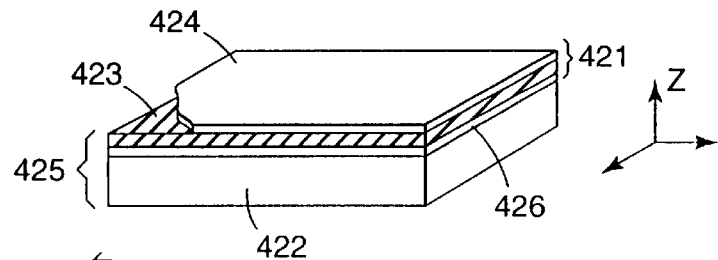
FIG. 4 illustrates a PZT slider used in the glide tester according to the present invention.

FIG. 4 illustrates a PZT slider 425. The PZT slider 425 includes a piezoelectric sensor 421 mounted to a slider 422. The sensor 421 includes a thin layer of piezoelectric material 423 coated on each of its two faces with a layer 424, 426 of conductive material. One of the layers 426 is bonded to the upper surface of the illustrated slider 422. As described above, the piezoelectric material 423 generates an electric charge signal in response to internal stresses caused by deformation experienced in the adjacent slider 422. One of the conductive layers 426 is grounded, and the other 424 is electrically coupled to amplifying, processing, and monitoring means (not shown).

Figure 5A:
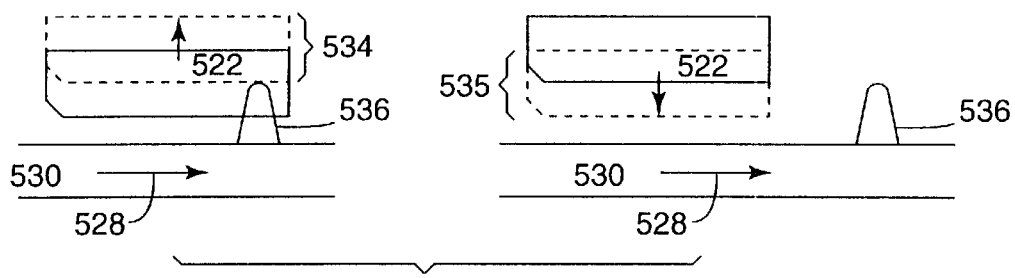
FIGS. 5(a) and (b) illustrate two types of displacement experienced by a slider as it flies over the rotating disk.
Figure 5B:
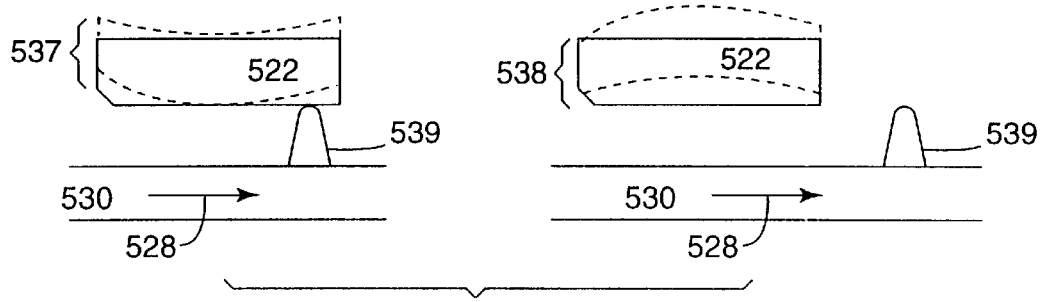

FIGS. 5(a) and (b) illustrate two types of displacement experienced by a slider 522 as it flies over the rotating disk 530. The disk 530 is moving relative to the slider 522 in the direction of the arrow 528. Rigid body displacement is indicated by the dashed lines 534, 535 in FIG. 5(a). Such out-of-plane displacement is generally caused by slider impact with a large surface asperity 536 or a change in slider acceleration relative to the disk 530. Flexural deformation or bending is indicated by the dashed lines 537, 538 of FIG. 5(b). Such deformation occurs whenever the slider contacts a large or small surface asperity 539. Rigid body motion generally occurs at much lower frequencies than flexural deformation, and as such is not generally relevant to the present invention. For small asperities, the piezoelectric signal from the flexural deformation is dominant.

Figure 6:
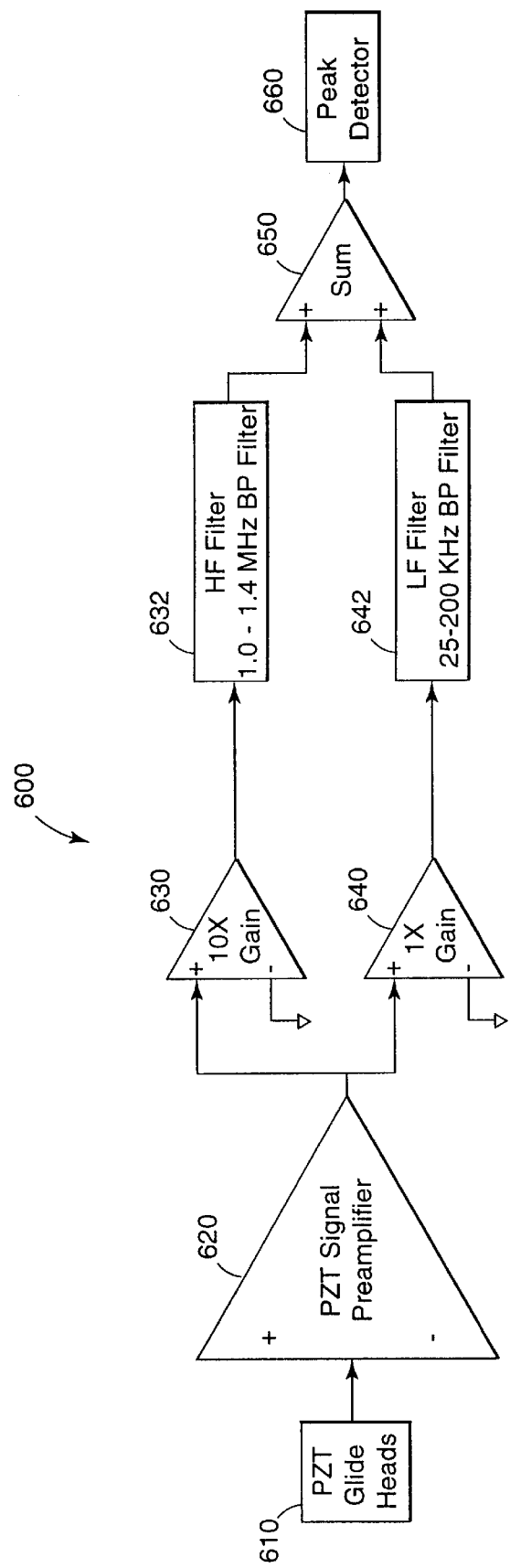
FIG. 6 illustrates a conventional read electronic circuit 600 that provides a piezoelectric glide channel.

FIG. 6 illustrates a conventional read electronic circuit 600 that provides a piezoelectric glide channel. In FIG. 6, the piezoelectric glide channel 600 includes small slider PZT glide heads 610. The signal from the PZT glide head 610 is received by a PZT preamplifier 620. The output of the PZT preamplifier 620 is passed through a first amplifier 630 in the high frequency path and a second amplifier 640 in the low frequency path. The ratio of the gain between the high frequency path and the low frequency path is 10:1. The outputs of the first and second amplifiers 630 and 640 are then filtered. The signal from the first amplifier 630 is passed through a high frequency filter 632, e.g., 1.0 MHz–1.4 MHz.

The signal from the second amplifier 640 in the low frequency path is passed through a low frequency filter 642, e.g., 25 KHz–200 KHz. The outputs of the two filters 632, 642 are added by adder 650 and passed to a peak detector 660. The peak detector identifies defects on the disk. However, small disk defects, (e.g., $\leq 1-5$ $\mu$m in diameter), are undetectable by the piezoelectric glide channel 600, which may therefore result in disk delamination and cause hard errors in disk storage files.

Figure 7:
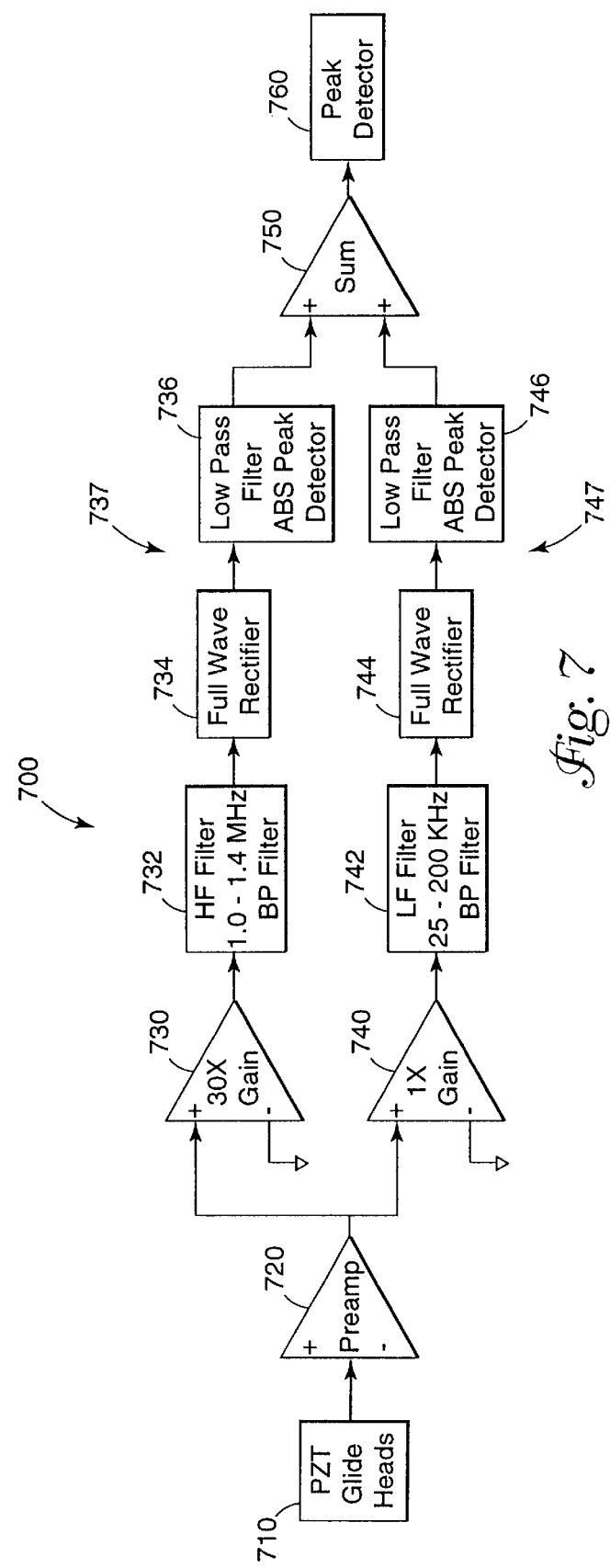
FIG. 7 illustrates a piezoelectric glide channel 700 according to the present invention.

FIG. 7 illustrates a more sensitive piezoelectric glide channel 700 according to one embodiment of the present invention. In FIG. 7, the piezoelectric glide channel 700 includes small slider PZT glide heads 710. The signal from the PZT glide head 710 is received by a PZT preamplifier 720. The output of the PZT preamplifier 720 is passed through a first amplifier 730 in the high frequency path 737 and a second amplifier 740 in the low frequency path 747. The gain for the amplifier in the high frequency path 737, and consequently the ratio between the high frequency amplifier 730 and the low frequency amplifier 740, is selected for increasing the sensitivity to small diameter and lower height defects. Preferably, the ratio of the gain between the high frequency path 737 and the low frequency path 747 is 30:1. However, those skilled in the art will recognize that the gain may be increased, e.g. to 100 resulting in a ratio of 100:1, to provide even greater sensitivity and therefore detect even smaller defects. Nevertheless, those skilled in the art will recognize that increasing the gain also results in more disks being identified as defective. Such a higher failure rate may not be desirable and a tradeoff between sensitivity of the piezoelectric glide channel 700 and the failure rate may be realized. Still, as slider geometry decreases with a corresponding decrease in the fly height, greater sensitivity will be desired.

After each of the first and second amplifiers 730, 740 generate an amplified signal, the outputs of the first and second amplifiers 730 and 740 are then filtered. The signal from the first amplifier 730 is passed through a high frequency filter 732, e.g., 1.0 MHz–1.4 MHz. The signal from the second amplifier 740 in the low frequency path 747 is passed through a low frequency filter 742, e.g., 25 kHz–200 kHz. Then the signals from the high frequency bandpass filter 732 and the low frequency bandpass filter 742 are passed through full wave rectifiers 734, 736 and analog peak detectors 736, 746 respectively. The outputs of the two analog peak detectors 736, 746 are summed by adder 750 and passed to a peak detector 760. Thus, the peak detector identifies defects on the disk and the channel is monotonic with increasing defect size, and can be calibrated with laser melt bumps.

In FIG. 7, the glide tester 700 sums signals from the low and high frequency paths, 747 and 737 respectively, prior to peak detection so that only one bipolar peak detector 760 is needed. However, this leads to under and overkill, as the phasing between the two frequencies affects the peak amplitude. Phasing varies from head to head, and defect to defect, so for example, if the peak high frequency is riding in the valley of the low frequency for a particular defect, that defect could escape. The signal phasing problem is solved, with no major glide tester hardware modifications, by adding a separate analog peak detector 736 for the high frequency path 737 and a separate analog peak detector 746 for the low frequency path 747 before summing the outputs 750 and peak detecting 760.

The disclosed glide tester 700 increases the sensitivity to small diameter and lower height defects by increasing the gain ratio between the high frequency path 737 and the low frequency path 747 (e.g., from 10:1 to 30:1 by providing the higher gain 730 in the high frequency path 737. Thus for one embodiment of the present invention, the resultant high frequency is three times more sensitive than for current channels. This is effective because high frequency is more sensitive to small diameter defects, (e.g., ≦1–5 μm in diameter), than low frequency, and has better signal to noise ratio. However, by still incorporating some low frequency, a larger dynamic range may be retained for ease of calibration, and for screening out disk damage (i.e., >10 μm diameter defects).

In summary, the present invention provides an enhanced glide tester that is more sensitive to smaller asperities. The enhanced glide tester is easily calibrated and maintains the positive characteristics of being monotonic. By increasing the gain in the high frequency path, the present invention allows screening out small disk defects, (e.g., ≦1–5 μm in diameter), that otherwise may delaminate causing hard errors in disk storage files, while retaining a large dynamic range for ease of calibration, and for screening out disk damage (i.e., >10 μm diameter defects).

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A piezoelectric glide channel, comprising:
   a first circuit for providing an electrical signal representing an asperity contact;
   a first bandpass circuit coupled to the first circuit, the first bandpass circuit having a first amplifier for amplifying the electrical signal by a first gain to generate a first amplified signal, and a first filter for filtering the first amplified signal at a first frequency to generate a first filtered signal, wherein the first gain is selected for detection of the asperities having a diameter of less than or equal to five microns; and
   a processing circuit, coupled to the first bandpass circuit, for processing the first filtered signal to generate an indication of contact within an asperity having a diameter of less than or equal to five microns.

2. The piezoelectric glide channel of claim 1 wherein the circuit for providing an electrical signal representing an asperity contact further comprises PZT slider heads coupled to a preamplifier.

3. The piezoelectric glide channel of claim 1 wherein the first filter further comprises a high pass filter, coupled to the first amplifier, the high pass filter selected to pass signals in a first predetermined band of frequencies.

4. The piezoelectric glide channel of claim 1 further comprising a second bandpass circuit coupled to the first circuit, the second bandpass circuit having a second amplifier for amplifying electrical signal by a second gain to generate a second amplified signal and a second filter for filtering the second amplified signal at a second frequency to generate a second filtered signal, wherein the ratio of the first gain to the second gain is substantially at least thirty to one.

5. The piezoelectric glide channel of claim 4 wherein the second filter further comprises a low pass filter, coupled to the second amplifier, the low pass filter selected to pass signals in a second predetermined band of frequencies.

6. The piezoelectric glide channel of claim 5 wherein the first bandpass circuit further comprises a first full wave rectifier coupled to the first filter for generating a first rectified signal representing the average for the filtered signals in the first predetermined band of frequencies and a first analog peak detector for detecting whether the first rectified signal exceeds a first frequency threshold and generating a first frequency detection signal in response thereto and the second bandpass circuit further comprises a second full wave rectifier coupled to the second filter for generating a second rectified signal representing the average for the filtered signals in the second predetermined band of frequencies and a second analog peak detector for detecting whether the second rectified signal exceeds a second frequency threshold and generating a second frequency detection signal and response thereto.

7. The piezoelectric glide channel of claim 6 wherein the processing circuit further comprises an adder for adding the first and second frequency detection signals into a single output signal, and a peak detector for receiving the output signal and generating a peak detection signal for indicating contact with an asperity having a diameter of less than or equal to five microns.

8. A piezoelectric glide tester, comprising:
   a disk having a surface;
   a spindle motor, coupled to the disk, for rotating the disk;
   an actuator having a suspension wherein a piezoelectric slider is mounted at a distal end of the suspension for converting asperity contact to an electrical signal, the actuator moving the piezoelectric slider radially across the surface;
   a control unit, coupled to the actuator and the motor, for coordinating the movement of the disk and the piezoelectric slider, and
   read electronics, coupled to the piezoelectric slider, for detecting the presence of asperities on the surface of the disk that exceed a predetermined threshold, the read electronics further comprising:
   a first circuit for providing an electrical signal representing an asperity contact;
   a first bandpass circuit coupled to the first circuit, the first bandpass circuit having a first amplifier for amplifying the electrical signal by a first gain to generate a first amplified signal and a first filter for filtering the first amplified signal at a first frequency to generate a first filtered signal, wherein the first gain is selected for detection of asperities having a diameter of less than or equal to five microns; and
   a processing circuit, coupled to the first bandpass circuit, for processing the first filtered signal to generate an indication of contact with an asperity having a diameter of less than or equal to five microns.

9. The piezoelectric glide tester of claim 8 wherein the circuit for providing an electrical signal further comprises PZT slider heads coupled to a preamplifier.

10. The piezoelectric glide tester of claim 8 wherein the filter further comprises a high pass filter, coupled to the first amplifier, the high pass filter selected to pass signals in a first predetermined band of frequencies.

11. The piezoelectric glide tester of claim 8 further comprising a second bandpass circuit coupled to the first circuit, the second bandpass circuit having a second amplifier for amplifying the electrical signal by a second gain to generate a second amplified signal and a second filter for filtering the second amplified signal at a second frequency to generate a second filtered signal, wherein the ratio of the first gain to the second gain is substantially at least thirty to one.

12. The piezoelectric glide tester of claim 11 wherein the second filter further comprises a low pass filter, coupled to the second amplifier, the low pass filter selected to pass signals in a second predetermined band of frequencies.

13. The piezoelectric glide tester of claim 12 wherein the first bandpass circuit further comprises a first full wave rectifier coupled to the first filter for generating a first rectified signal representing the average for the filtered signals in the first predetermined band of frequencies and a first analog peak detector for detecting whether the first rectified signal exceeds a first frequency threshold and generating a first frequency detection signal in response thereto and the second bandpass circuit further comprises a second full wave rectifier coupled to the second filter for generating a second rectified signal representing the average for the filtered signals in the second predetermined band of frequencies and a second analog peak detector for detecting whether the second rectified signal exceeds a second frequency threshold and generating a second frequency detection signal in response thereto.

14. The piezoelectric glide tester of claim 13 wherein the processing circuit further comprises an adder for adding the first and second frequency detection signals into a single output signal, and a peak detector for receiving the output signal and generating a peak detection signal for indicating contact with an asperity having a diameter of less than or equal to five microns.

15. A method of detecting asperities on the surface of a magnetic recording medium, comprising the steps of:

providing an electrical signal representing an asperity contact;

amplifying the electrical signal by a first gain to generate a first amplified signal, wherein the first gain is selected for detection of asperities having a diameter of less than or equal to five microns;

filtering the first amplified signal at a first frequency to generate a first filtered signal; and processing the first filtered signal to generate an indication of contact with an asperity of a predetermined size.

16. The method of claim 15 wherein the electrical signal is preamplified.

17. The method of claim 15 wherein the step of filtering the first amplified signal further comprises the step of filtering the first amplified signal by a high pass filter selected to pass signals in a first predetermined band of frequencies.

18. The method of claim 15 further comprising the steps of amplifying the electrical signal by a second gain to generate a second amplified signal and filtering the second amplified signal at a second frequency to generate a second filtered signal, wherein the ratio of the first gain the second gain is substantially at least thirty to one.

19. The method of claim 18 wherein the step of filtering the second amplified signal further comprises the step of filtering the second amplified signal by a low pass filter selected to pass signals in a second predetermined band of frequencies.

20. The method of claim 19 further comprising the steps of generating a first rectified signal representing the average for the filtered signals in the first predetermined band of frequencies, detecting whether the first rectified signal exceeds a first frequency threshold and generating a first frequency detection signal in response thereto, generating a second rectified signal representing the average for the filtered signals in the second predetermined band of frequencies, and detecting whether the second rectified signal exceeds a second frequency threshold and generating a second frequency detection signal in response thereto.

21. The method of claim 20 wherein the step of processing the first and second bandpass signals further comprises the steps of adding the first and second frequency detection signals into a single output signal, and generating a peak detection signal based upon the single output signal for indicating contact with an asperity having a diameter of less than or equal to five microns.

* * * * *

UNITED STATES PATENT AND TRADEMARK OFFICE
CERTIFICATE OF CORRECTION

PATENT NO. : 6,092,412
DATED : July 25, 2000
INVENTOR(S) : Flechsig et al.

It is certified that error appears in the above-identified patent and that said Letters Patent is hereby corrected as shown below:

Column 3,
Line 27, replace "can" with -- contact --

Column 10,
Line 13, after "first gain" insert -- to --

Signed and Sealed this

Twenty-first Day of May, 2002

Attest:

JAMES E. ROGAN
Attesting Officer  Director of the United States Patent and Trademark Office